United States Patent
Parada

[11] Patent Number: 5,855,144
[45] Date of Patent: Jan. 5, 1999

[54] STEERING WHEEL

[76] Inventor: Nikolay Parada, 1066 E. 13th St., Brooklyn, N.Y. 11230

[21] Appl. No.: 183,571

[22] Filed: Jan. 19, 1994

Related U.S. Application Data

[63] Continuation of Ser. No. 912,815, Jul. 13, 1992, abandoned.

[51] Int. Cl.$^6$ ........................................................ B62D 1/04
[52] U.S. Cl. ........................ 74/552; 74/558; 74/471 XY; 74/484 R; 280/731; 200/61.54; 200/61.57
[58] Field of Search ...................... 74/552, 558, 471 XY, 74/484 R; 280/731; 200/61.54, 61.57

[56] References Cited

U.S. PATENT DOCUMENTS

| | | | |
|---|---|---|---|
| D. 135,167 | 3/1943 | Obszarny et al. | 74/552 |
| D. 157,440 | 2/1950 | Schindler | 74/552 |
| 1,103,438 | 7/1914 | Scheibert | 200/61.57 |
| 1,287,680 | 12/1918 | Hanna | 200/61.57 |
| 1,366,552 | 1/1921 | Blackburn | 200/61.57 |
| 1,683,988 | 9/1928 | Reading | 200/61.57 |
| 2,173,265 | 9/1939 | Richards | 200/61.57 |
| 2,211,131 | 8/1940 | Knauber | 200/61.57 |
| 2,827,801 | 3/1958 | Ingolia | 74/552 |
| 2,863,015 | 12/1958 | Ahrens | 74/552 |
| 2,946,869 | 7/1960 | Parks et al. | 74/552 |
| 3,087,352 | 4/1963 | Daniel | 74/552 |
| 3,304,801 | 2/1967 | Sakita et al. | 74/552 |
| 3,435,702 | 4/1969 | Smith | 74/552 |
| 3,576,530 | 4/1971 | Buechler | 200/61.54 |
| 4,374,310 | 2/1983 | Kato et al. | 200/61.54 |
| 4,535,221 | 8/1985 | Holsworth | 74/552 |
| 4,578,592 | 3/1986 | Nakazawa et al. | 200/61.54 X |
| 4,604,912 | 8/1986 | Sugita et al. | 74/484 R |
| 4,612,425 | 9/1986 | Kanai et al. | 74/552 X |
| 4,655,308 | 4/1987 | Kraus et al. | 180/78 |
| 4,697,092 | 9/1987 | Roggendorf et al. | 200/61.54 X |
| 4,729,254 | 3/1988 | Nogami et al. | 74/484 R |
| 4,797,538 | 1/1989 | Schick | 200/61.57 X |
| 4,821,598 | 4/1989 | Yamazawa et al. | 428/113 X |
| 5,002,306 | 3/1991 | Hiramitsu et al. | 280/731 |
| 5,021,771 | 6/1991 | Lachman | 74/471 XY |

FOREIGN PATENT DOCUMENTS

| | | | |
|---|---|---|---|
| 4649/26 | 11/1927 | Australia | 200/61.57 |
| 2410590 | 8/1979 | France | 74/552 |
| 2654698 | 5/1991 | France | 74/551.1 |
| 1035498 | 7/1958 | Germany | 200/61.57 |
| 2936350 | 3/1981 | Germany | 200/61.54 |
| 3306269 | 8/1984 | Germany | 74/551.1 |
| 218330 | 8/1925 | United Kingdom | 200/61.57 |
| 2030367 | 4/1980 | United Kingdom | 200/61.57 |

*Primary Examiner*—Vinh T. Luong

[57] ABSTRACT

A steering wheel of a transportation device includes controls positioned on the wheel. The controls are operable by operator's fingers and may be connected to the various electrical and electronic devices of the transportation device. Further, in one of the embodiments, controls are positioned on a circular grip member of the wheel. In one of the embodiments, the steering wheel includes a display positioned on the hub-like connecting member of the wheel, which can show radio frequency, time, temperature, etc.

21 Claims, 4 Drawing Sheets

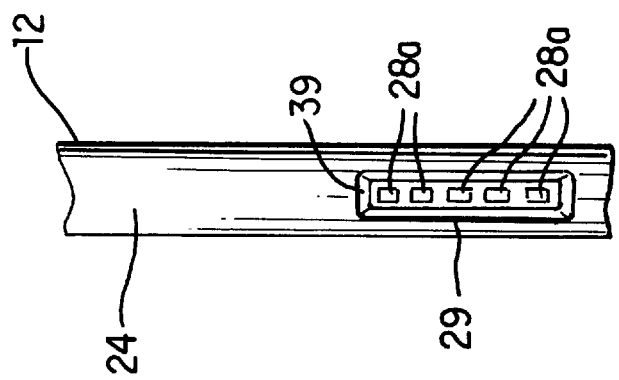
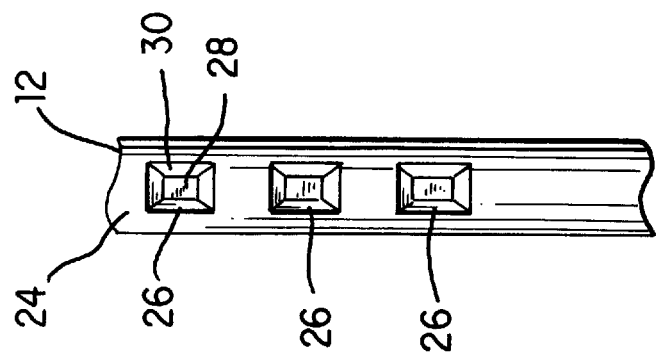

STEERING WHEEL

This application is a continuation application of U.S. application Ser. No. 07/912,815 filed Jul. 13, 1992 now abandoned.

BACKGROUND OF THE INVENTION.

The present invention relates to steering wheel and, more particularly, to a steering wheel having controls for various devices located on the wheel or in close proximity to the wheel.

It is desirable to have controls positioned on the steering wheel. For example, it is highly inconvenient and even dangerous to change a radio station while operating an automobile, a boat, an airplane, etc. The radio is located on a dashboard at a distance from the steering wheel. To change a radio station in, e.g., a car, a driver have to take a look at the radio and either to reach for a radio handle or knob to tune to a station, or to look for the proper knob to push to get tuned to the pre-set station. All these operations require that a driver stops looking at the road for certain period of time. In addition, it is quite inconvenient for a driver to stretch his hand to the radio while holding the steering wheel. This inconvenience is even greater if a driver is wearing a seat belt. The same inconvenience occurs when a driver tries to reach the air conditioner or heater controls located on the dashboard, and change either the temperature inside the cabin, or the mode the air conditioner or heater are working in. Same applies for turning on a defogger or a defroster, or any other device located in a transportation device.

SUMMARY OF THE INVENTION.

Briefly stated, the present invention provides a steering wheel of a transportation device which includes a control means positioned on the wheel which allow an operator to control various devices of the transportation device while operating it.

According to an embodiment of the invention, there is provided a steering wheel for a transportation device, comprising a gripping member, a one or more connecting members connecting said circular member with a steering column, and a control means for controlling various devices of said transportation device positioned on said steering wheel.

According to another embodiment of the invention, there is provided a steering wheel for a transportation device, comprising a gripping member, a one or more connecting members connecting said circular member with a steering column, and a control means for controlling various devices of said transportation device positioned in close proximity to said steering wheel.

The transportation device may be of any type, and includes an automobile, a boat, an airplane, etc.

In another embodiment, the controls are positioned on the gripping member. In still another embodiment, the controls may be positioned on the connecting members. The connecting members may include a hub-like member and spoke-like member or members.

In another embodiment, the hub-like member has a display on its front side facing an operator of the device, and may include a radio display, temperature control display, time display, etc.

The above, and other features and advantages of the present invention will become apparent from the following description read in conjunction with the accompanying drawings, in which like reference numerals designate the same elements.

BRIEF DESCRIPTION OF THE DRAWINGS

FIG. 5 is an enlarged view of a portion of the gripping member of one of the embodiments of the invention.

FIG. 6 is an enlarged view of a portion of the gripping member of one of the embodiments of the invention.

DETAILED DESCRIPTION OF THE PREFERRED EMBODIMENTS

Figure 1:
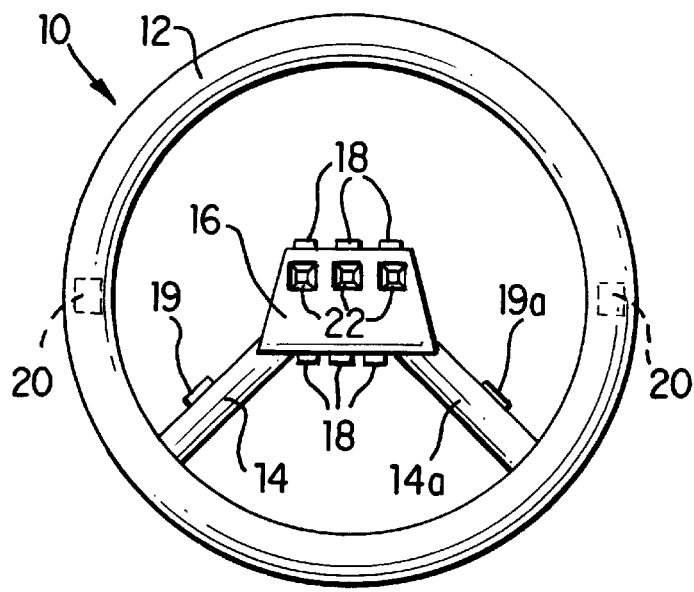
FIG. 1 is a front view of the first embodiment of the steering wheel of the invention.

Referring to FIG. 1, there is shown, generally at 10, a steering wheel of the present invention.

Figure 2:
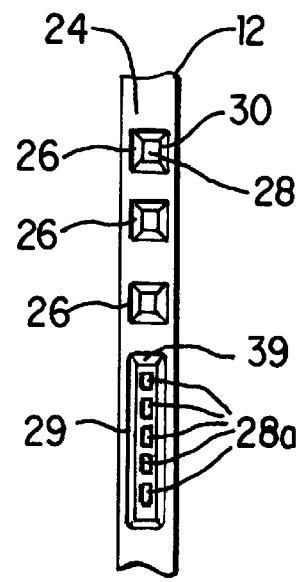
FIG. 2 is a an enlarged view of a portion of the gripping member of the first embodiment of the invention.

The steering wheel 10 includes a gripping member 12 and connecting members 14 and 16. The connecting member 16 is a hub-like member which, in turn, connects to a steering column 34. The connecting members 14 and 14a are spoke-like elongated members connecting the gripping member 12 with the hub-like connecting member 16. The control means 18, 19 and 19a may be positioned on the hub-like member 16 and/or spoke-like members 14 and 14a. Control means 18, 19 and 19a may also be positioned on the gripping member 12, like control means 20, 26, 28, 31 and 29. Control means may be of any suitable kind, e.g., pressure-sensitive, touch-sensitive, or heat-sensitive. They may be buttons, switches, etc. They can be either protruding, like control means 18, or positioned in a recess, like control means 22, 26, 29 and 31. As it is seen at FIG. 2, a recessed control means 26 and 29 may be conveniently located on the gripping member 12. They may be located at any part of the gripping member 12. At FIG. 2, control means 26 and 29 are located on an internal side 24 of the gripping member 12. Such recessed control means preferably include a control pad 28 which may be either pressure-sensitive or touch-sensitive. At FIG. 2, each control pad is positioned in a cavity 30 or 39. Cavities 30 may be of any convenient shape: rectangular, round, oval, etc. There may also be an individual cavity 30 for every pad 28 as it is shown in FIGS. 2 and 5, or several pads 28a may be positioned in one cavity 39 of the corresponding size, as it is shown in FIG. 2 and FIG. 6. The pads 28 and 28a are so constructed that they are easily reachable by the fingertips. At the same time, the recessed construction of the control means 26 and 29 allows easy unobstructed gripping of any part of the gripping member 12 by the hand of an operator. Control means 18, 20, 26, 29 and 22 may be electrically connected to various electrical devices of the transportation device, and allow their convenient control without much distraction from the road, waterway, etc. The electrical devices may be radio, air conditioner, heater, defroster, window controls, windshield wipers, etc. In case of the windshield wipers, there may be separate controls for various wiping speeds, e.g., one control for "slow" wiping action, another one—for "medium", and another one for "fast" one.

Figure 4:
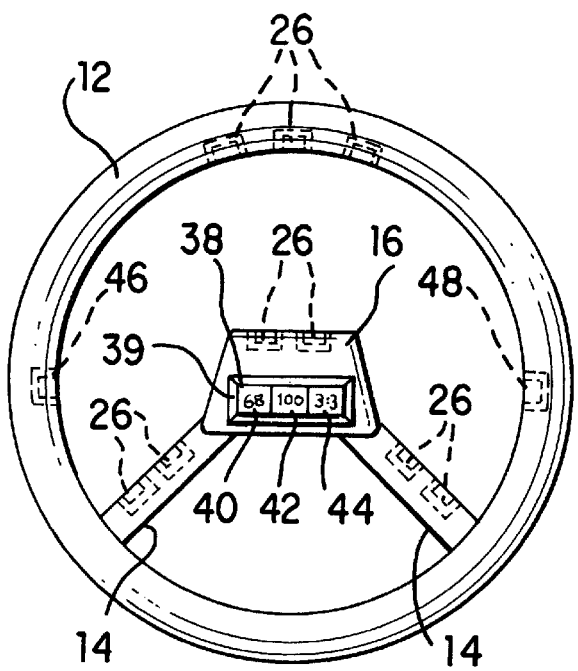
FIG. 4 is a front view of the third embodiment of the steering wheel of the invention having a display on a front side of the hub-like member.
Figure 7:
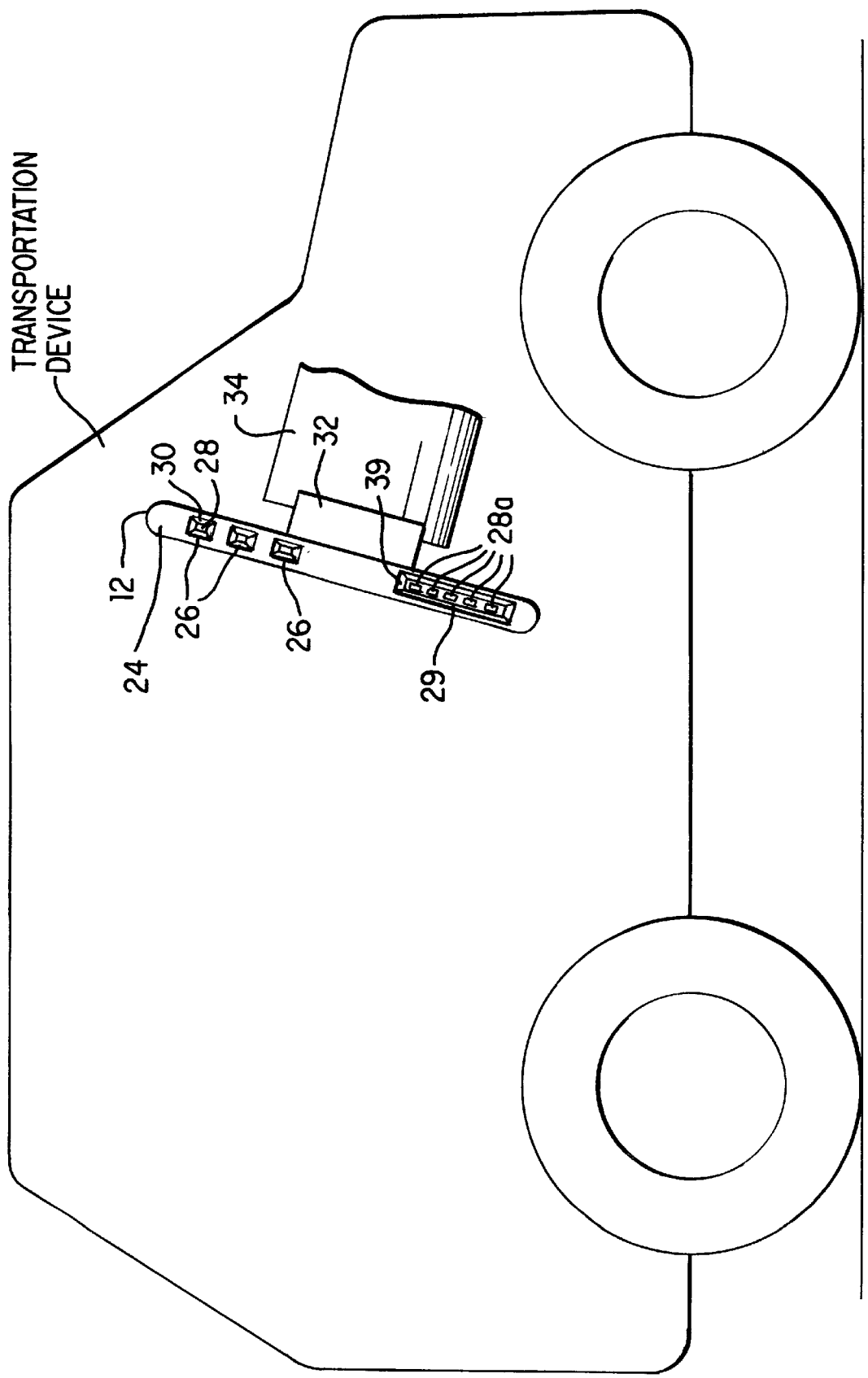
FIG. 7 is a view of a transportation device and of a steering wheel of one of the embodiments of the invention.
Figure 8:
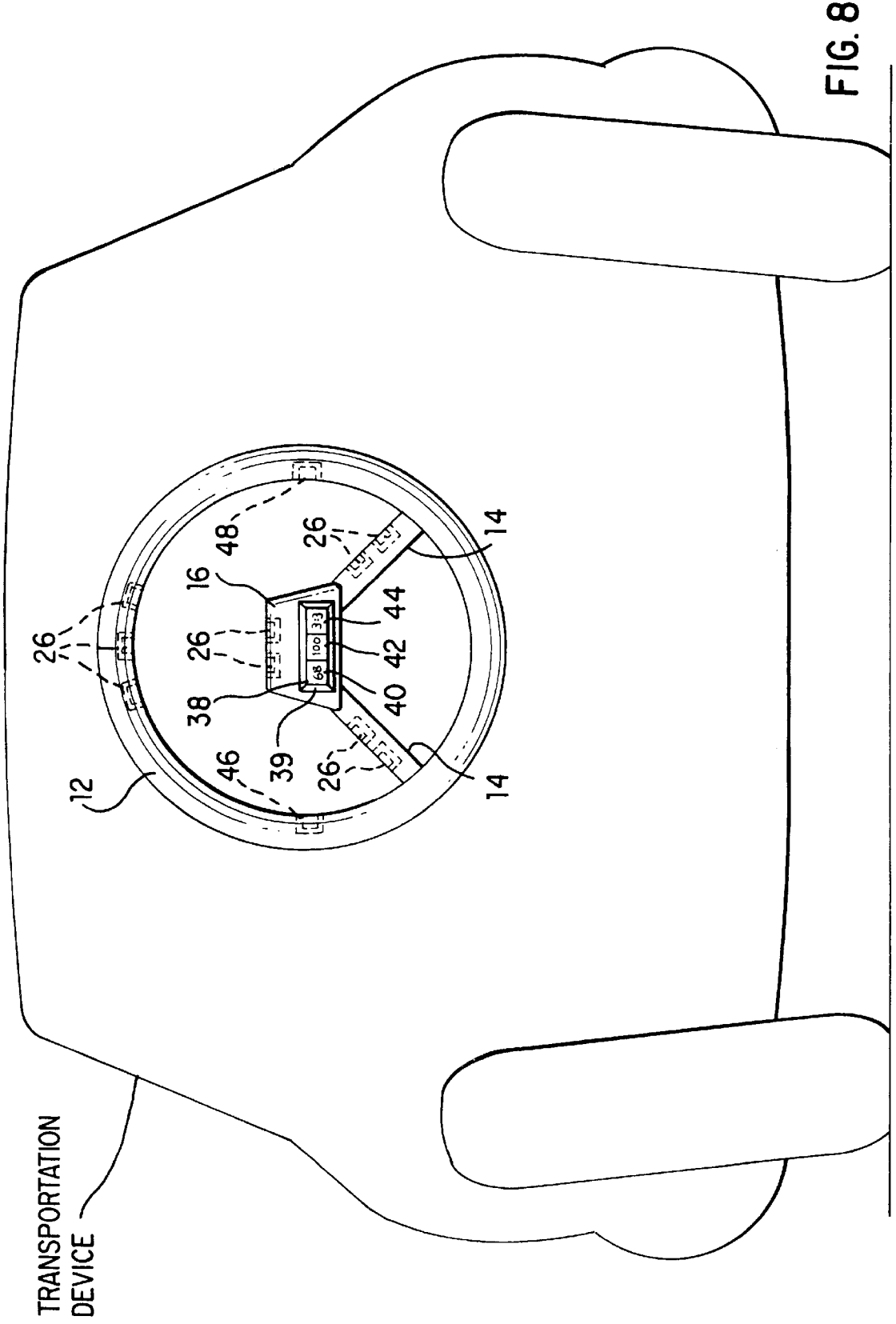
FIG. 8 is a view of a transportation device and of a steering wheel of one of the embodiments of the invention.

FIG. 4 shows the steering wheel of the invention having a display 38 positioned on a front side of the hub-like member 16. The display 38 may be located in a recess 39. The display 38 may show various data, e.g., it may show time, radio modes (e.g., frequency, am or fm, etc.), the internal or external temperature, settings of the automatic temperature control, etc. At FIG. 4, the display 38 has a temperature display 40, radio frequency display 42, and a time display 44. The display 38 is connected to the various devices located in the transportation device, and control means 26, and can register various data reflecting the functions programmable or changeable by the control means 26.

The radio, air conditioner, heater, etc. are operated by the control means 26, 46 and 48, which may be positioned at various places on the steering wheel—on the gripping member 12, the hub-like member 16, or spoke-like members 14 and 14a. As it is seen on FIG. 4, control means 26, 46 and 48 may be located at different parts of gripping member 12:control means 26 are located at the top portion of gripping member 12, and control means 46 and 48 are located on left and right portions, correspondingly. The display 38 may be of any suitable kind, e.g., digital LCD, light-emitting, etc.

Figure 3:
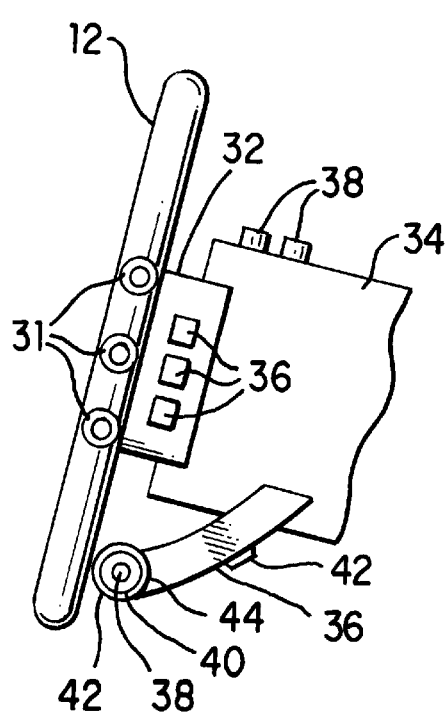
FIG. 3 is a side view of the steering wheel of the second embodiment of the invention.

FIG. 3 shows the steering wheel of the present invention having some of the control means 36 positioned on a side member 32 and a control means 38 positioned on a part of the steering column 34 in close proximity to the steering wheel 10. Control means can also be positioned on member 36 attached to the steering column 34. Control means 38 and 42 may be a button or a pad in the cavity, and control means 40 may be a knob having several separate controls 42 and 44. Controls 42 and 44 are rotating rings which may be used to tune to a radio station.

The control means may be made of any suitable material including plastic, metal, ceramics, etc.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A steering wheel for a transportation device, comprising:
   a gripping member of a circular shape having a gripping surface;
   at least one connecting member connecting said gripping member with a steering column, and
   a control means positioned on said steering wheel for controlling various devices of said transportation device, wherein said control means include a plurality of control pads positioned for operation by fingertips of a driver on said gripping member in at least one open at one side recess so said control pads do not project beyond said gripping surface, which are reachable by the fingertips of the driver,
   wherein each said at least one open at one side recess contains more than one of said control pads.

2. A steering wheel of claim 1, wherein said devices are selected from a group consisting of a radio, air conditioner, heater, defroster, window controls, and windshield wipers.

3. A steering wheel of claim 1, wherein said control means are positioned on an internal side of said gripping member.

4. A steering wheel of claim 1, wherein said at least one connecting member include a hub-like member comprising a display positioned on a front side of said hub-like member.

5. A steering wheel of claim 4, wherein said display includes a radio frequency display and an am/fm display.

6. A steering wheel of claim 4 wherein said display includes a time display positioned on a front side of said hub-like member.

7. A steering wheel of claim 4 wherein said display includes a temperature control display positioned on a front side of said hub-like member.

8. A steering wheel of claim 1 wherein each of said control pads is positioned below said gripping surface of said gripping member allowing unobstructed gripping of any part of said gripping member by a hand of the driver.

9. A steering wheel of claim 8, wherein said control means are touch-sensitive control means.

10. A steering wheel of claim 8 wherein said control means are heat-sensitive control means.

11. A steering wheel of claim 1, wherein said control means are a pressure-sensitive control means.

12. A steering wheel of claim 1, wherein said control means are located at a predetermined positions on said gripping member.

13. A steering wheel, comprising:
   a gripping member of a circular shape having a gripping surface;
   at least one connecting member connecting said gripping member with a steering column, and
   a control means positioned on said steering wheel for controlling various electric and electronic devices of said transportation device, wherein said control means include a plurality of control pads each of which is positioned for operation by fingertips of a driver on said gripping member in a separate open at one side recess, said pads being reachable by the fingertips of the driver, wherein said devices are selected from a group consisting of a radio, air conditioner, heater, defroster, window controls, and windshield wipers.

14. A steering wheel of claim 13, wherein each of said control pads is positioned below said gripping surfaces of said gripping member allowing unobstructed gripping of any part of said gripping member by a hand of the driver.

15. A steering wheel of claim 14, wherein said control means are touch-sensitive control means.

16. A steering wheel of claim 14, wherein said control means are heat-sensitive control means.

17. A steering of wheel of claim 13, wherein said control means are pressure-sensitive control means.

18. A steering wheel of claim 13, wherein said control pads are located at a predetermined positions on said gripping member.

19. A transportation device, comprising:
   a steering wheel, said steering wheel including a gripping member of a circular shape having a gripping surface;
   at least one connecting member connecting said gripping member with a steering shaft;
   various electrical and electronic devices;
   a control means positioned on said gripping member for controlling said various electrical and electronic devices of said transportation device, said control means including a plurality of control pads being positioned for operation by fingertips of a driver on said gripping member in at least one open at one side recess, so said control pads do not project beyond said gripping surface, which are reachable by the fingertips of a driver,
wherein said devices are selected from a group consisting of a radio, air conditioner, heater, defroster, window controls, and windshield wipers.

20. A steering wheel of claim 19, wherein each of said control pads is positioned below said gripping surface.

21. A steering wheel of claim 20, wherein said control means are selected from a group consisting of a pressure-sensitive control means, touch-sensitive control means and a heat-sensitive control means.

* * * * *